May 20, 1958  C. P. ROTH  2,834,979
WINDSHIELD WIPER TRANSMISSION
Filed June 25, 1954
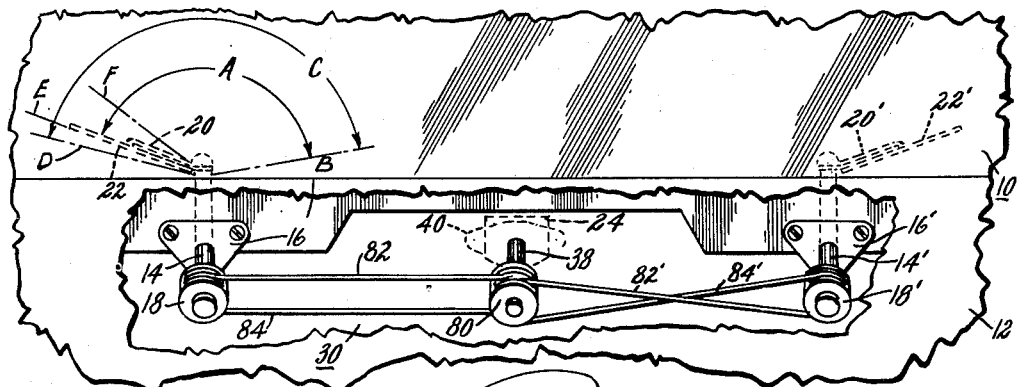
Fig. 1
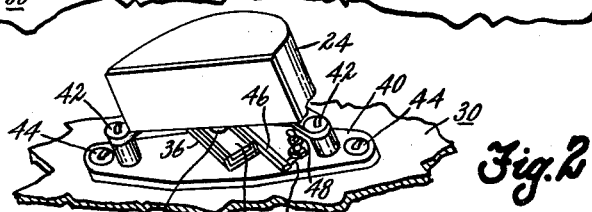
Fig. 2
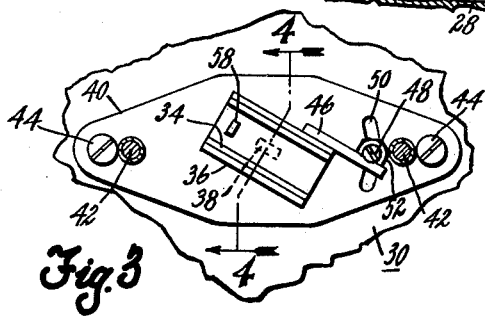
Fig. 3
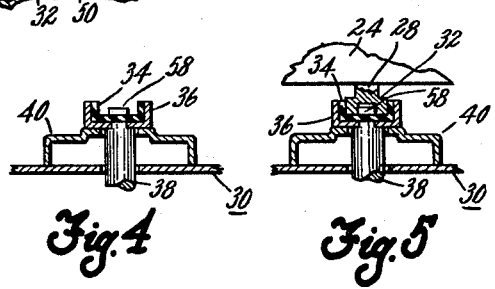
Fig. 4
Fig. 5
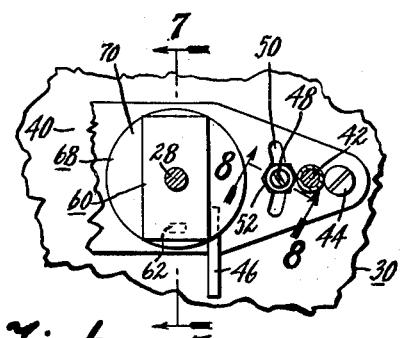
Fig. 6
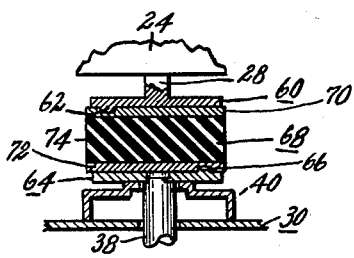
Fig. 7
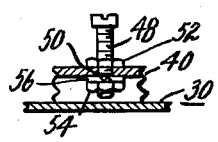
Fig. 8
INVENTOR.
CHARLES P. ROTH
BY
Craig V. Morton
HIS ATTORNEY

United States Patent Office 2,834,979
Patented May 20, 1958

2,834,979

WINDSHIELD WIPER TRANSMISSION

Charles P. Roth, Dearborn, Mich., assignor to General Motors Corporation, Detroit, Mich., a corporation of Delaware Application June 25, 1954, Serial No. 439,261

6 Claims. (Cl. 15—253)

This invention pertains to windshield wiper transmissions, and particularly to an improved cable transmission assembly.

The windshield cleaning apparatus in present day vehicles, of necessity, includes a cable transmission which drivingly interconnects the actuating mechanism and the wiper shaft. The present invention seeks to obviate difficulties encountered with cable transmissions due to excessive free play, as well as appreciably minimizing the problems encountered by reason of the variable load imposed upon the actuating mechanism due to the variable coefficient of friction between the wiper blades and the vehicluar transparency. In particular, this invention constitutes an improvment of copending application, Serial No. 437,084, filed June 16, 1954, in the name of Daniel M. Adams et al., and includes means for minimizing shrinkage of the wiping stroke which is caused by the aforementioned factors whereby a substantially constant area will be wiped under all conditions. Accordingly, among my objects are the provision of wiper drive means which effect a substantially constant amplitude wiping stroke irrespective of the condition of the windshield and/or actuating mechanism; the further provision of a cable transmission for windshield wipers including positive stroke stop means for limiting the outboard stroke end of the wiper blades under ideal conditions; and the still further provision of shock absorbing coupling means between the motor and the auxiliary driving mechanism.

The aforementioned and other objects are accomplished in the present invention by modifying the auxiliary driving mechanism to include means for positively limiting the outboard stroke end of the wiper blades under ideal conditions. Thus, the wiper blades will have imparted thereto oscillation of an amplitude less than that produced by the actuating mechanism under ideal conditions whereby a substantially constant wiping stroke will be maintained under all conditions. Specifically, the auxiliary driving mechanism, which may be of the type shown in the Horton Patent 2,651,801, includes a driving pulley assembly, which is connected to rotate with a shaft. The shaft extends through an aperture in a mounting plate, which is attached to the firewall of a vehicle. The free end of this shaft has attached thereto a coupling member which is arranged to drivingly engage a complementary coupling member attached to the motor driven shaft.

The auxiliary driver coupling member carries a stop arm which is arranged to abut an adjustable, stationary stop pin carried by the mounting plate. The arrangement of the complementary stroke stops is such that the stops will abut only during movement of the motor shaft which effects movement of the wiper blades to their outboard stroke ends. The stationary adjustable stop is positioned so that under ideal conditions, the outboard stroke end of the wiper blades is determined by engagement of the complementary stops, thereby causing the wiper stroke to be of an amplitude less than that produced by the actuating mechanism.

In order to absorb the impact to which the auxiliary driver and the motor are subjected by the abrupt stroke stop, and to reduce the criticality of the position of the adjustable stop, the coupling between the motor and the auxiliary driver includes shock absorbing means. In one embodiment, the auxiliary driver coupling member is of channel shape, and the motor coupling member is constituted by a cross head arranged to be received within the channel. To absorb the impact, a rubber section is bonded to the channel-shaped coupling member, the rubber acting as a cushion. In another embodiment, an intermediate cushion assembly comprising a pair of metal discs with a rubber cushion disposed therebetween and bonded thereto, is disposed between the coupling members of the motor and the auxiliary driver. In this embodiment, the driving connection between the motor and the auxiliary driver is effected by friction as the several parts are securely clamped together in the vehicle installation.

Further objects and advantages of the present invention will be apparent from the following description, reference being had to the accompanying drawing wherein a preferred embodiment of the present invention is clearly shown.

In the drawing:

Fig. 1 is a fragmentary view, in elevation, of a portion of the dash panel and windshield of a vehicle including the improved transmission assembly of this invention.

Fig. 2 is a fragmentary view, in perspective, depicting the manner in which the power unit, or motor, is connected to the auxiliary driving mechanism and attached to the firewall.

Fig. 3 is a fragmentary view, in elevation, with certain parts removed, of the auxiliary driving mechanism disposed on the engine side of the firewall.

Fig. 4 is a sectional view taken along line 4—4 of Fig. 3.

Fig. 5 is a fragmentary view, partly in section and partly in elevation, of one form of the interconnection and coupling means between the power unit and the auxiliary driving mechanism.

Fig. 6 is a fragmentary view, in elevation, similar to Fig. 3 of a modified coupling.

Fig. 7 is a fragmentary view, partly in section and partly in elevation, of the modified coupling means, taken along line 7—7 of Fig. 6.

Fig. 8 is a fragmentary sectional view of the adjustable stationary stop taken along line 8—8 of Fig. 6.

With particular reference to Fig. 1 of the drawing, the improved windshield wiper apparatus of this invention is shown incorporated in a vehicle having a windshield 10, which is positioned above a dash panel 12. According to conventional practice, the vehicle is equipped with two wipers disposed on opposite sides of the medial portion of the windshield and arranged to be operated in synchronism. Thus, the wiping mechanism for one side of the windshield includes a shaft 14, which is rotatably supported by bearing means, not shown, carried by supporting bracket 16, which is attached to the firewall 30 of the vehicle. The shaft 14 is rotatably connected to a driven spool assembly 18. The shaft 14 projects through the vehicle body and has attached thereto a wiper arm 20, which is detachably connected to a wiper blade 22. Like parts of the wiper disposed on the other side of the windshield are indicated by like numerals with primes affixed.

The wiping mechanism includes a motor 24 constituting the power means, or power unit, which is mounted on the engine side of the firewall 30, as depicted in Fig. 2. Although the motor disclosed herein is of the suction type, this is only exemplary as it is readily apparent that the present invention may be used in conjunction with motors of the hydraulic or electric type. In any event, the motor 24 is capable of imparting oscillatory movement of a predetermined amplitude to a drive shaft 28, which, as shown in Fig. 2, has attached thereto a cross head 32. The cross head 32 is designed to be received in a channeled head 36, which is attached to the end of a driven shaft 38, as shown in Figs. 4 and 5. The heads 32 and 36 constitute a readily detachable coupling for interconnecting shafts 28 and 38. One form of the coupling is depicted in Figures 3 through 5, and another form of coupling is depicted in Figures 6 and 7. Regardless of the type of coupling used, the power unit 24 is fastened to a mounting plate 40 by means of screws 42. The mounting plate 40 is attached to the firewall by means of screws 44. As depicted in Figures 4, 5 and 7, the mounting plate 40 and the firewall 30 have aligned openings through which the driven shaft 38 extends.

The driven shaft 38 projects through the firewall 30 and has attached thereto a driving pulley assembly 80. The driving pulley assembly 80 is interconnected with the driven pulley assembly 18 by means of a pair of flexible cables 82 and 84. In this manner, oscillation of the shaft 28 will be imparted to the wiper blades during operation of the motor 24 throughout a wiping stroke A. When the wiper motor 24 is inactivated, the blades will automatically be moved through the angle B to a parked position against the cowl portion of the motor vehicle.

I have observed that the oscillatory stroke of wipers varies considerably, particularly on severely curved vehicular transparencies, commonly known as wrap around windshields. This "shrinkage" may be caused by variation in the available suction for actuating a suction motor; variation in the load imposed upon the motor due to the variable coefficient of friction between the blades and windshield; excessive free play in the drive apparatus; or a combination of all, or any, of the aforegoing. The present invention seeks to obviate these difficulties so as to insure that a substantially constant area of the transparency will be cleaned by the wipers during inclement weather under all conditions. Furthermore, the present invention constitutes an improvement over the aforementioned copending application inasmuch as the same result is accomplished with fewer parts.

The phenomenon of shrinkage results in an erratic area being cleaned by the wiper blades due to variation in the wiping strokes thereof. In particular, shrinkage is only of importance adjacent the outboard end of the stroke, the area under consideration lying between lines E and F in Fig. 1. In order to obviate shrinkage, the channeled head 36, as shown in Figs. 3 through 5, has attached thereto a stop arm 46, which is arranged to abut a stationary stop pin 48, which is attached to the mounting bracket 40. It is to be noted that the stop arm 46 is only arranged to engage the stop pin 48 so as to effect a positive stroke stop for the wiper blades adjacent their outboard stroke ends.

As shown in Figs. 3 and 8, the mounting plate 40 has an arcuate slot 50 therein through which the pin 48 extends. The pin may conveniently be made from a bolt which receives a nut 52 on the top side of the bracket 40, as viewed in Fig. 8, and a nut 54 and lock washer 56 on the bottom side thereof. In this manner, the position of the stop pin 48 may be adjusted, after which the stop pin is securely held in place.

In order to absorb the impact and lessen the shock to which the auxiliary driving mechanism and motor unit are subjected due to engagement of the stop arm 46 with the stop pin 48, the coupling between the motor unit and the auxiliary driving mechanism includes shock absorbing means. As disclosed in Figs. 3 through 5, the shock absorbing means comprise a layer of rubber, or rubber-like, material 34, which is bonded to the internal surfaces of the channeled head 36. Thus, in assembly, as depicted in Fig. 5, the cross head 32 is received within the cushioned channeled head 36 and retained therein by the assembly depicted in Fig. 2. The channeled head 36 may conveniently be provided with a locating pin 58, which is arranged to be received in a complementary hole formed in the cross head 32.

A modified shock absorbing coupling is depicted in Figs. 6 and 7 wherein the drive shaft 28 has connected therewith a plate member 60 having a location pin 62. Similarly, the driven shaft 38 has attached thereto a plate member 64 having a location pin 66. Interposed between the two plates 60 and 64 is a cushion assembly 68 comprising a pair of spaced metal discs 70 and 72 having suitable slots arranged to receive the locating pins 62 and 66, and a layer of elastomeric material 74 disposed between the two discs and bonded thereto. The driven plate 64 has attached thereto the stop arm 46, which is arranged to abut the stop pin 48 in the manner aforedescribed.

Operation of the improved windshield wiper apparatus is believed to be readily apparent from the preceding description. Suffice it to say that the motor unit 24 is capable of imparting oscillation of a predetermined amplitude to the drive shaft 28, designated by the angle C in Fig. 1. The adjustable stop 48 is positioned so that the stop arm 46 will abut the pin 48 so as to positively limit the amplitude of oscillation imparted to the wiper blades to an amplitude less than that produced by the motor unit 24. Thus, under ideal conditions, the wiping stroke is limited to the angle A, depicted in Fig. 1, whereas the actuating mechanism is capable of moving the blade 22 to the outboard position, designated by the line D. In this manner, the total stroke travel of the blades under all conditions will be substantially constant, since the normal shrinkage between lines E and F will be substantially eliminated.

While the embodiment of the present invention as herein disclosed, constitutes a preferred form, it is to be understood that other forms might be adopted.

What is claimed is as follows:

1. A windshield cleaning system including, a power unit, a wiper, a driven unit connected to said wiper, a wiper actuating transmission unit, auxiliary driving mechanism interconnecting said power unit and said transmission unit, said transmission unit interconnecting said auxiliary driving mechanism and said driven unit, said power unit being capable of imparting oscillation of a predetermined amplitude to said wiper, a stationary stop member, a complementary stop member attached to said auxiliary driving mechanism and engageable with said stationary stop member to positively limit the oscillation of the outboard stroke of said auxiliary driving mechanism to an amplitude less than the predetermined amplitude of said power unit whereby the oscillatory amplitude of said wiper will remain substantially constant under all conditions, and a resilient drive connection between said power unit and said auxiliary drive mechanism for absorbing the extra movement of said power unit.

2. In combination with a vehicle having a firewall and a windshield, windshield wiper mechanism comprising: power means mounted on one side of said firewall, a wiper actuating transmission unit disposed on the other side of said firewall, auxiliary driving mechanism interconnecting said transmission unit and said power means including a shaft which extends through said firewall, a wiper, said transmission unit interconnecting said auxiliary driving mechanism and said wiper, said power means being capable of imparting a stroke of predetermined amplitude to said wiper, the interconnection between said auxiliary driving mechanism and said power unit including a readily detachable coupling, stop means operatively associated with said coupling for positively limiting the stroke of said auxiliary driving mechanism to an amplitude less than the predetermined amplitude of said power means, said stop means comprising a stop arm attached to and rotatable with said coupling, a complementary stationary stop operatively connected with said firewall and positioned so that said coupling carried stop arm will abut said stationary stop so as to positively limit the outboard stroke end of said wiper under ideal conditions, and a resilient drive connection between said power means and said auxiliary driving mechanism for absorbing the extra movement of said power means.

3. Apparatus of the character set forth in claim 2 wherein the position of said stationary stop may be adjusted, and wherein said stationary stop is carried by a mounting plate which is attached to the firewall.

4. A windshield cleaning system including, a power unit, a wiper actuating transmission unit, auxiliary driving mechanism interconnecting said power unit and said transmission unit, a wiper, said transmission unit interconnecting said auxiliary driving mechanism and said wiper, said power unit being capable of imparting oscillation of a predetermined amplitude to said wiper, the interconnection between said auxiliary driving mechanism and said power unit including a readily detachable, resilient coupling, and stop means operatively associated with said coupling for positively limiting the oscillation of said auxiliary driving mechanism to an amplitude less than the predetermined amplitude of said power unit, said stop means including an adjustable stationary stop disposed adjacent the periphery of said coupling and a complementary stop attached to and movable with said coupling, said stops being arranged to abut each other so as to limit the outboard stroke end of said wiper under ideal conditions.

5. Apparatus of the character set forth in claim 4 wherein said coupling comprises a pair of members, one of which is connected to said power unit and the other of which is connected to said auxiliary driving mechanism, said members being maintained in frictional engagement with an intermediate cushion assembly comprising a pair of spaced metal discs having a layer of elastomeric material disposed therebetween and bonded thereto.

6. Apparatus of the character set forth in claim 4 wherein said power unit includes a shaft, wherein said auxiliary driving mechanism includes a shaft, and wherein said coupling comprises a cross head attached to one of said shafts, a channeled head attached to the other of said shafts, said cross head being designed to be received within said channeled head, and a layer of elastomeric material disposed between said heads and bonded to said channeled head.

References Cited in the file of this patent

UNITED STATES PATENTS

| | | |
|---|---|---|
| 2,538,344 | Wahlberg | Jan. 16, 1951 |
| 2,574,504 | Sivacek | Nov. 13, 1951 |
| 2,643,528 | Hammarbach | June 30, 1953 |
| 2,651,801 | Horton | Sept. 15, 1953 |
| 2,660,894 | McClelland | Dec. 1, 1953 |
| 2,745,130 | Oishei | May 15, 1956 |